(12) United States Patent
Chang et al.

(10) Patent No.: US 7,177,362 B2
(45) Date of Patent: Feb. 13, 2007

(54) APPARATUS FOR ADAPTIVE RESOLUTION OF PHASE AMBIGUITY VALUE

(75) Inventors: Dae Ig Chang, Yuseong-Gu (KR); Eun A Choi, Jeonju (KR); Nae Soo Kim, Daedeok-Gu (KR)

(73) Assignee: Electronics and Telecommunications Research Institute (KR)

( * ) Notice: Subject to any disclaimer, the term of this patent is extended or adjusted under 35 U.S.C. 154(b) by 752 days.

(21) Appl. No.: 10/412,829

(22) Filed: Apr. 14, 2003

(65) Prior Publication Data

US 2004/0081247 A1 Apr. 29, 2004

(30) Foreign Application Priority Data

Oct. 25, 2002 (KR) ...................... 10-2002-0065601

(51) Int. Cl.
H04L 27/00 (2006.01)
H04L 27/10 (2006.01)
H04B 1/00 (2006.01)
H03D 3/18 (2006.01)

(52) U.S. Cl. ...................... 375/259; 375/130; 375/279; 375/327

(58) Field of Classification Search ................ 375/259, 375/130, 279, 327
See application file for complete search history.

(56) References Cited

U.S. PATENT DOCUMENTS 5,025,455 A * 6/1991 Nguyen ...................... 375/327
5,822,339 A 10/1998 Hart
6,304,614 B1 * 10/2001 Abbaszadeh et al. ....... 375/279
6,625,197 B1 * 9/2003 Lundby et al. ............. 375/130

OTHER PUBLICATIONS

IEEE Transactions on Communications, vol. 38, No. 12, Dec. 1990, pp. 2087-2088.

* cited by examiner

Primary Examiner—Temesghen Ghebretinsae
Assistant Examiner—Cicely Ware
(74) Attorney, Agent, or Firm—Blakely Sokoloff & Taylor & Zafman

(57) ABSTRACT

An apparatus for resolution of phase ambiguity is disclosed. The apparatus receives a modulated signal and resolves a phase ambiguity of the modulated signal while recovering the modulated signal to original data, wherein the apparatus includes a phase ambiguity detector for receiving demodulated data and frame synchronization information, and detecting a phase ambiguity value from the demodulated data based on a frame synchronization information; a phase ambiguity eliminator for receiving the phase ambiguity value and the demodulated data, and generating a phase ambiguity eliminated data by inverting the phase ambiguity value and multiplying the inverted phase ambiguity value and the demodulated data. The present invention can resolve a phase ambiguity occurred in various modulation modes including a burst mode communication with the same algorithm so it can effectively be implemented to an adaptive MODEM.

7 Claims, 8 Drawing Sheets

APPARATUS FOR ADAPTIVE RESOLUTION OF PHASE AMBIGUITY VALUE

FIELD OF THE INVENTION

The present invention relates to an apparatus for adaptively resolving a phase ambiguity by directly detecting a phase ambiguity value from a various receiving signal.

DESCRIPTION OF RELATED ARTS

Recently, a national wide high speed information network has been built with a satellite and it has been used for a high definition television HDTV, a three-dimension TV, a multimedia communication based on a motion picture expert group-2 (MPEG-2) transport stream, an asynchronous transfer mode (ATM) and a high speed internet. The national wideband high speed information network requires reliable transmission channel and effective use of a satellite channel bandwidth. For effectively using the satellite channel bandwidth, a multi-dimension phase shift keying (M-PSK) of an adaptive modulation/demodulation (MODEM) technique is also required.

A phase shift keying (PSK) demodulator recovers a phase and frequency offset by using a carrier recovery circuit, however, the PSK demodulator can not resolve a phase ambiguity. Moreover, in a Multi-dimension phase shift keying (M-PSK) modulation method, the phase ambiguity of M−1 phase ambiguity values could occur.

The phase ambiguity is generated without any relations to a channel noise and a forward error correction (FEC) decoder could not recover data having a phase ambiguity. Therefore, the phase ambiguity resolution should be performed before FEC decoding.

In the M-PSK modulation method, a phase of a two-dimensional complex number domain contains transmission data information. Therefore, information contained in the phase of demodulated symbol is very important for recovering to original transmission data. The M-PSK demodulator demodulates a receiving signal based on a phase position in a constellation of predetermined demodulation method, however, a whole phase of demodulated receiving signal may be rotated. As a result, the phase ambiguity is occurred as a following equation 1.

$$d_m(t) = \sqrt{2} \cdot e^{j(2\pi f_o t - 2\pi m/M + \theta_i)}$$

, where $m=1, \ldots, M$.  eq. 1

M−1 phase ambiguity values may be generated and it may be a multiple of inverse proportion value of M. The phase ambiguity value is defined as following equation 2. Therefore, the scheme for resolving of phase ambiguity is required.

$$\theta_i = 2\pi i/M$$

where $i = 0, \ldots, (M-1)$.  Eq. 2

Conventionally, a phase ambiguity is resolved by using a differential encoding method or detecting Unique Word (UW) or bits error rate (BER) after forward error correction (FEC) decoding.

FIG. 1 is a diagram illustrating a conventional apparatus equipping a differential encoder/decoder for resolution of phase ambiguity.

Referring to FIG. 1, the apparatus equipping the differential encoder/decoder includes a data source 10, a block encoder 11 for error correction, differential encoders 12 for resolution of phase ambiguity, a convolution encoder 13 for error correction, a modulator 14 for modulating a coded data, a demodulator 15 for demodulating modulated signal, a TC/Viterbi decoder 16 for error correction, differential decoders 17 for resolution of phase ambiguity, a frame synchronization detector 18 for detecting a start point of block code by using a frame synchronization pattern shown in FIG. 2, a block decoder 19 for error correction and a receiver 22.

FIG. 2 shows data formats of MPEG-2 transport stream (TS). A structure of data formats shown in FIG. 2 is adopted for a communication system using a block code. The data format shown in FIG. 2 is constructed for detecting a start point of the block code. The start point is a point of beginning a block code and it is detected by detecting a synchronization byte.

Referring to FIGS. 1 and 2, the differential encoder 12 generates a differential-code data c(k) based on a relation of input data m(k) and 1-bit delayed data c(k−1). The differential code data d(k) is defined by following equation 3.

$$c(k) = \overline{c(k-b1)} \oplus m(k)$$  Eq. 3

The differential decoder 17 resolves the phase ambiguity based on a relation of received data c'(k) and c'(k−1) and recovers c'(k) to original signal d(k). Therefore, it is expressed by following equation 4.

$$d(k) = \overline{c'(k-1)} \oplus c'(k)$$  Eq.4

Table 1 shows steps for resolution of phase ambiguity by using the differential encoder.

TABLE 1

| c (0) = 0 | k = 1 | k = 2 | k = 3 | k = 4 | k = 5 | k = 6 | K = 7 |
|---|---|---|---|---|---|---|---|
| m (k) | 0 | 0 | 1 | 0 | 1 | 1 | 0 |
| c (k) | 1 | 0 | 0 | 1 | 1 | 1 | 0 |
| c' (k) | 1 | 0 | 0 | 1 | 1 | 1 | 0 |
|  | 0 | 1 | 1 | 0 | 0 | 0 | 1 |
| d (k) | 0 | 0 | 1 | 0 | 1 | 1 | 0 |

Referring to Table 1, the input data m(k) is converted to c(k) by the differential encoder 12 and the received data c'(k) is converted to d(k) by the differential encoder 17. As shown in Table 1, the d(k) is identical to the input data m(k) without any relation of the phase ambiguity of c'(k).

In a meantime, a differential coding phase shift keying (DSPK) method is also conventionally used for resolution of phase ambiguity.

A bit error rate (BER) of phase shifting keying (PSK) modulation method is expressed as following equation 5 and the bit error rate (BER) of differential coding phase shift keying (DSPK) modulation method is expressed as following equation 6.

$$P_{e,psk} = Q\left(\sqrt{\frac{2E_b}{N_o}}\right)$$  Eq. 5

$$P_{e,dpsk} = 2Q\left(\sqrt{\frac{2E_b}{N_o}}\right)\left[1 - Q\left(\sqrt{\frac{2E_b}{N_o}}\right)\right] \approx 2Q\left(\sqrt{\frac{2E_b}{N_o}}\right),$$  Eq. 6 where $Q(x) = \int_x^\infty (1 - \sqrt{2\pi}) \exp(-u^2/2) du$.

In case of the DPSK modulation method, a performance is degraded since two times more "$E_b/N_o$" is required for same bit error rate (BER) as shown in Eq. 6. That is, if errors are generated during coding the received signal m(k), then the errors are propagated to the decoder. As a result, the errors are spread and the performance would be more degraded.

As mentioned above, the DPSK method for resolving the phase ambiguity has a problem of degrading the receiving performance and requires an additional apparatus not only in the receiver but also in the transmitter.

The block code such as a Reed-Solomon code is decoded and encoded within a block unit. Therefore, information regarding to a start point of code block is required even in a continuous data transmission type and the start point of the RS block code is conformed by detecting a frame synchronization byte (Frame sync).

FIG. 3 is a block diagram depicting a conventional apparatus for resolution of phase ambiguity by detecting a bit error rate (BER).

Referring to FIG. 3, the conventional apparatus includes a multiplexer 31, a phase ambiguity value holder 32, a radian converter 33, a multiplier 34, a modulation type change detector 35, a timer 36, an AND_gate 37 and an inverter 38.

The multiplexer 31 selects one of phase ambiguity basic values according to a modulation type.

The phase ambiguity value holder 32 receives the phase ambiguity basic value, determines the phase ambiguity value by detecting the threshold BER, and maintains the phase ambiguity value until the modulation method is changed.

The radian converter 33 converts the phase ambiguity value to a radian value.

The multiplier 34 converts a phase of a receiving signal z(k) by multiplying the phase ambiguity radian value to the receiving signal Z(k).

The modulation type change detector 35 detects a change of modulation type for resetting the phase ambiguity vale holder 32 or maintaining the phase ambiguity value remained in the phase ambiguity value holder 32.

The timer 36 records and shows a time spent for detecting "ber-ok" information at an error correct decoder (FEC) 21 after converting the phase of receiving signal by the multiplier 34.

The error correct decoder 21 determines the phase ambiguity existence by detecting the lower BER than the threshold BER value.

The conventional apparatus in FIG. 3 resolves the phase ambiguity by obtaining information regarding the existence of the phase ambiguity in data decoded at the error correct decoder 21.

A constellation of modulated signal is decided according to a type of modulation. According to Eq. 2, a 180° phase ambiguity may be created in the BPSK modulation method and multiple of 90° degree phase ambiguity may be generated in a Quadrature Phase shifting keying (QPSK) modulation method. Also, in a 8-PSK modulation method, multiple of 45° phase ambiguity may be generated.

Based on the above mentioned fact of the phase ambiguity value according to the type of modulation, steps of resolving the phase ambiguity are explained below.

The phase ambiguity value holder 32 receives "ber_ok", which is information of a bit error rate (BER) of decoded data from the FEC decoder 21. If "ber_ok" is 0, the phase ambiguity value holder 32 changes a previous held phase ambiguity value according to the modulation method (BPSK→180, QPSK→90, 8-PSK→45) and shifts a phase of received signal $Z_k$ by using the multiplier 34. After shifting the phase of received signal $Z_k$, the phase ambiguity value holder holds the changed phase ambiguity value until the modulation type detector 35 detects variation of the modulation method in a next period.

In the next period, if new "ber_ok" is inputted and its information is still 0, then the phase of the receiving signal is changed according to the phase ambiguity basic value selected from the multiplexer 31. After changing the phase, the phase ambiguity value holder 32 waits for next "ber_ok" signal from the error correct decoder 21. If next new "ber_ok" is inputted and if the information of "ber_ok" becomes 1, the phase ambiguity value holder maintains the previously selected phase ambiguity value for resolution of the phase ambiguity.

As mentioned above, the method resolves the phase ambiguity based on the bit error rate BER by rotating a phase of demodulated signal. Therefore, the method requires maximum M times rotation of the phase and bit error rate detector at a demodulator. Above mentioned characteristic of the method is not suitable for a burst mode communication since time consumption is required to resolve the phase ambiguity.

Furthermore, the conventional method based on the differential code requires more than 3 dB electric powers for maintaining communication performance. It is a considerable problem in a satellite communication system, which has limited transmitting power and channel bandwidth. Also, in the conventional method based on the bit error rate (BER), more processing time is required since the phase of a modulated signal has to be rotated in order to confirm the bit error rate (BER). Therefore, the BER-based method is not suitable for a burst mode communication.

SUMMARY OF THE INVENTION

It is, therefore, an object of the present invention to provide a apparatus for adaptively resolving a phase ambiguity, wherein the apparatus is suitable to a burst mode communication, a continuous mode communication, various modulation methods such as BPSK, QPSK, TC-8PSK and an adaptive modem by detecting a phase ambiguity value directly from a receiving signal.

In accordance with an aspect of the present invention, there is provided an apparatus for resolution of phase ambiguity, including: an encoder for encoding input data in order to error correction and generating a coded data; a modulator for modulating the coded data and outputting modulated signal; a demodulator for demodulating the modulated signal and outputting demodulated data; a phase ambiguity detector for detecting a phase ambiguity value of the demodulated data and outputting detected phase ambiguity value; a phase ambiguity eliminator for resolving the phase ambiguity of the demodulated signal based on the detected phase ambiguity value and outputting phase ambiguity eliminated data; and a decoder for decoding the phase ambiguity eliminated data in order to error correction.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

For describing the apparatus for resolution of phase ambiguity in accordance with the present invention in detail, a principal of the apparatus of the present invention is explained first hereinafter.

Figure 1:
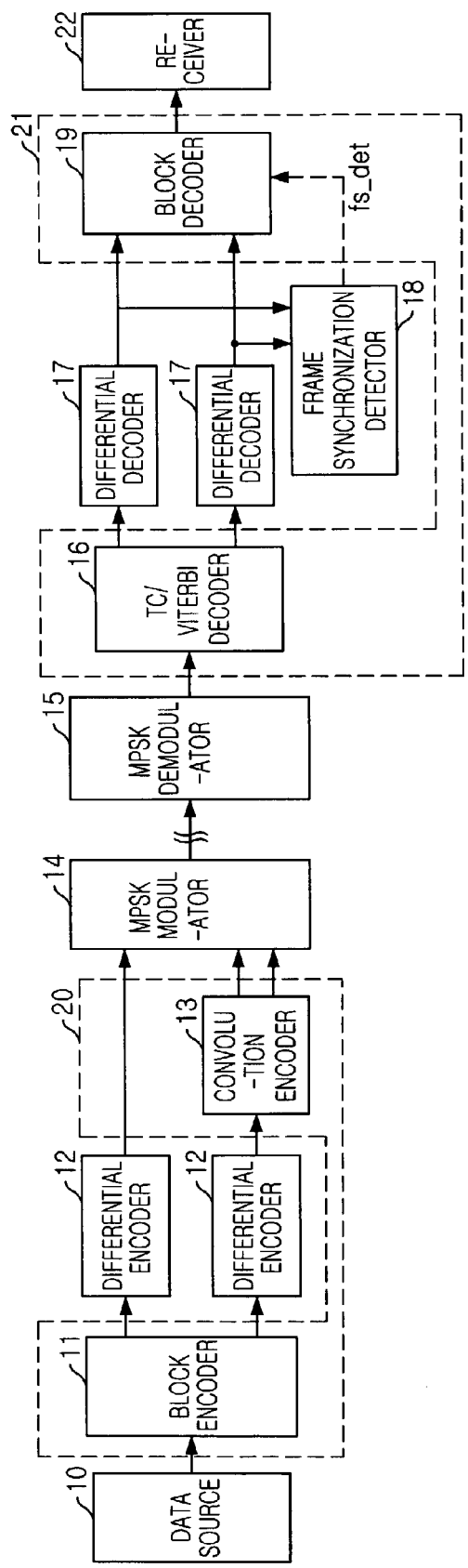
FIG. 1 is a diagram illustrating a conventional apparatus equipping a differential encoder/decoder for resolution of a phase ambiguity.
Figure 2:
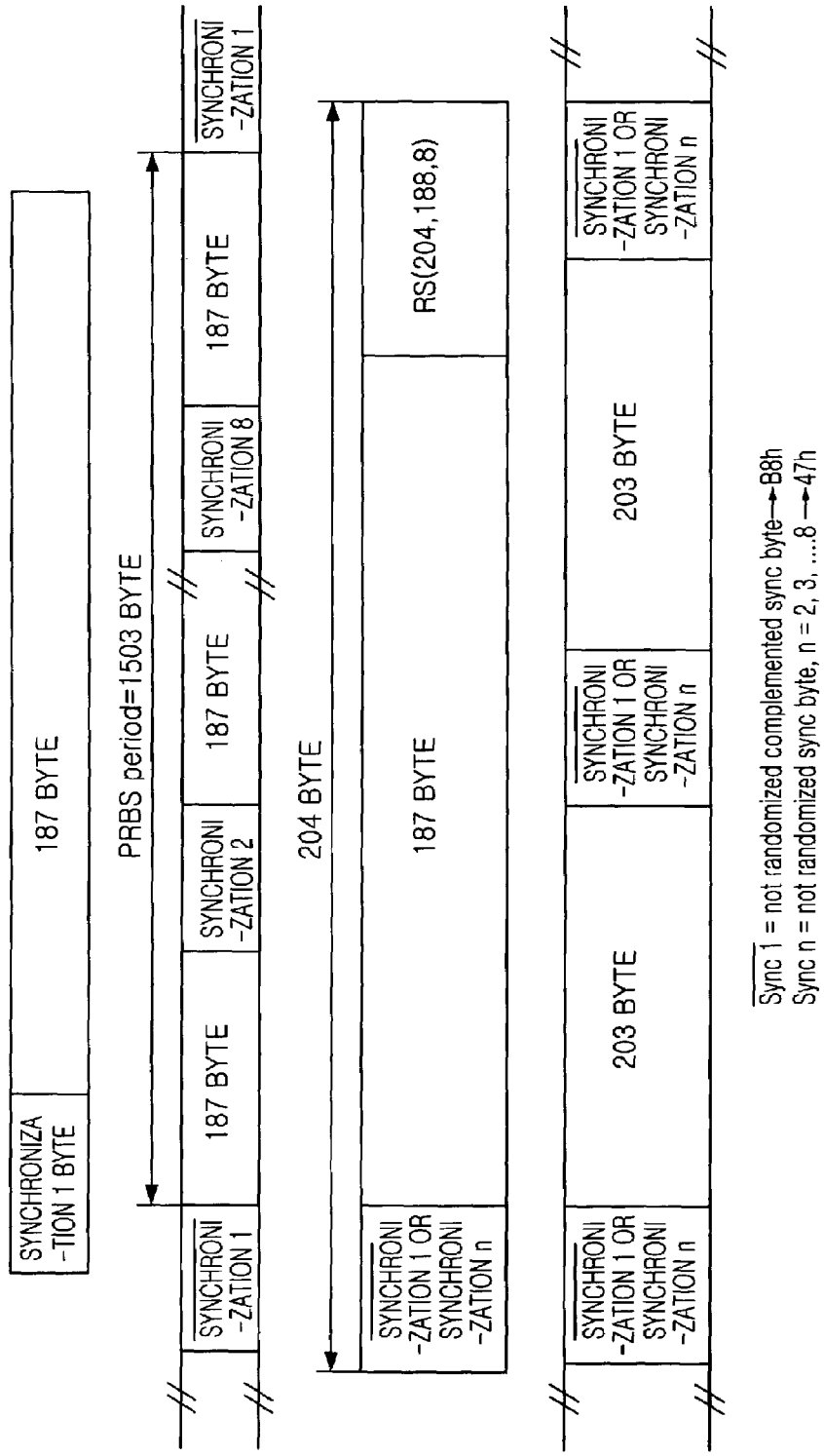
FIG. 2 shows data formats of MPEG-2 TS.
Figure 3:
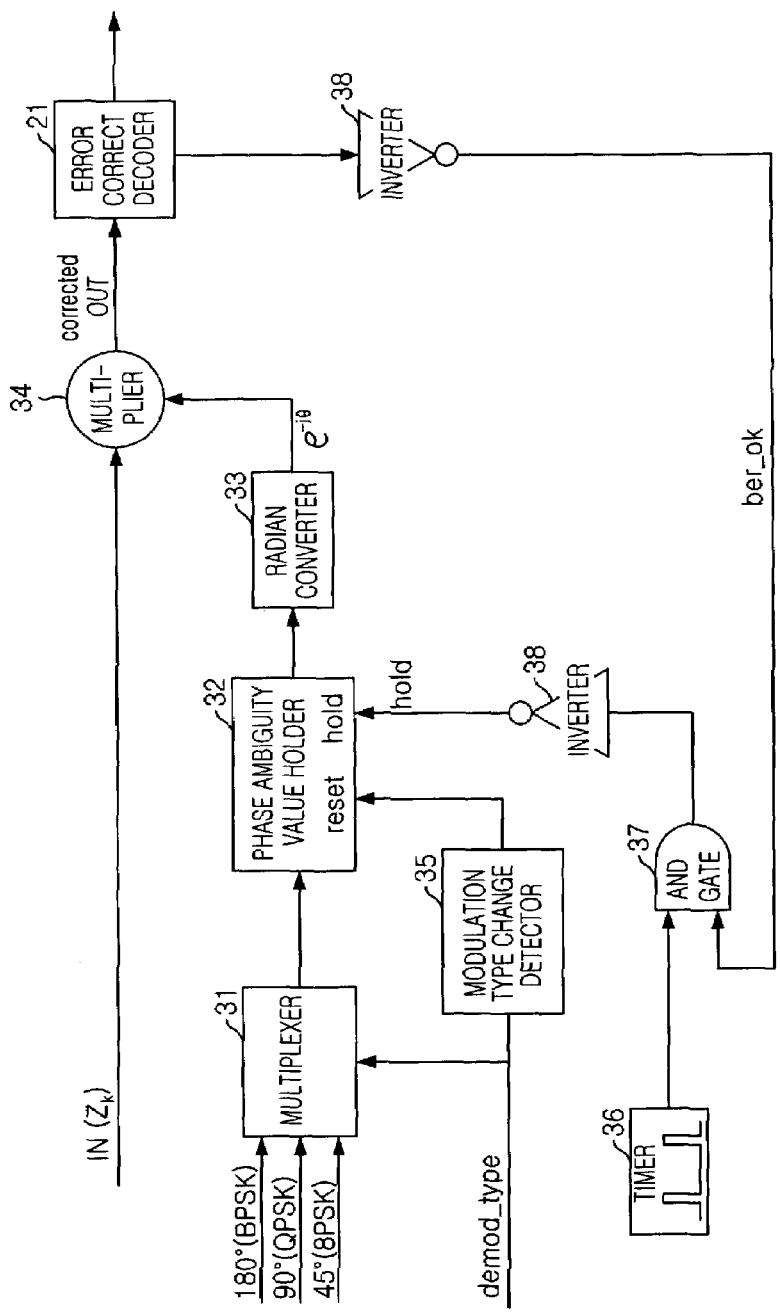
FIG. 3 is a block diagram depicting a conventional apparatus for resolution of a phase ambiguity by detecting a bit error rate BER.

The apparatus of the present invention adaptively resolves the ambiguity of a various receiving data by detecting a phase ambiguity value directly from the receiving data. For directly detecting the phase ambiguity value, the apparatus uses a frame synchronization pattern detected during a demodulation process. The frame synchronization (Frame Sync) pattern as shown in FIG. 2 is used for detecting a start point of decoding and encoding of Reed-Solomon block code. Based on the frame synchronization pattern, offset information of demodulated signal can be detected. The offset information contains a phase ambiguity value. Therefore, the phase ambiguity value can be detected based on the offset information of demodulated signal.

Hereinafter, a scheme for detecting the phase ambiguity value from the receiving data based on the frame synchronization pattern.

At first, a scheme for detecting the phase ambiguity value for a binary phase shift keying (BPSK) mode modulation is explained in below.

In the BPSK mode modulation, constellations of received signal for one byte of a frame synchronization symbol "01000111(47h)" and one byte of inverted frame synchronization symbol "10111000(B8h)" are expressed as following equations 7A and 7B, respectively.

$$s_0, s_1, \ldots, s_7 = \sqrt{2}(+1,-1,+1,+1,+1,-1,-1,-1) \quad \text{Eq. 7A}$$

$$\overline{s_0}, \overline{s_1}, \ldots, \overline{s_7} = \sqrt{2}(-1,+1,-1,-1,-1,+1,+1,+1) \quad \text{Eq. 7B}$$

Figure 4A:
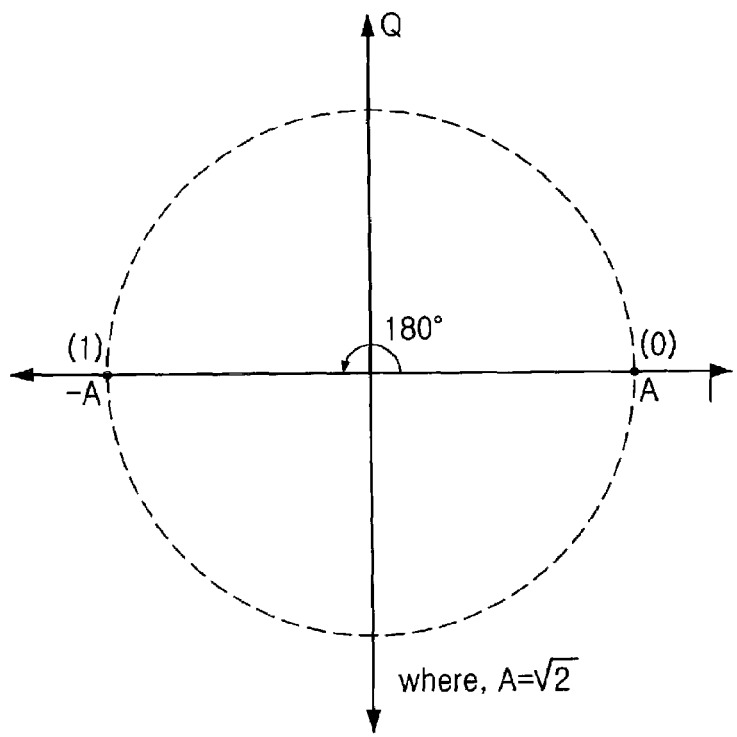
FIGS. 4A, 4B and 4C show constellations in accordance with a modulation mode of the present invention.

A constellation modulated according the BPSK mode is shown in FIG. 4A. In a modulated signal $Z_k$ according to the BPSK mode, 180° phase ambiguity may be generated according to Eq. 2. Below table shows phase ambiguity value in the BPSK mode.

TABLE 2

| Phase ambiguity value | Input "0" | Input "1" |
|---|---|---|
| 0° | A | −A |
| 180° | −A | A |

The phase ambiguity values can be derived based on the phase ambiguity information by using a correlator of below equation 8.

$$R(k) = \sum_{i=0}^{7} \hat{d}_{k-i} s_i^* \quad \text{Eq. 8}$$

In the Eq. 8, $d_k$ is a decision symbol of a demodulated signal $z_k$ and $s_i$ is a constellation function of a frame synchronization symbol.

As shown in Table 2, if the frame synchronization value is 0, it is mapped to A and if the synchronization value is 1 then it is mapped to −A.

Below equation 9A defines a phase ambiguity information is 0 degree when the phase ambiguity is not occurred.

$$R_{bpsk,0}(k) = 4[A \cdot \sqrt{2} + (-A) \cdot (-\sqrt{2})] = 8\sqrt{2}A = 8A\sqrt{2}e^{j0°} \quad \text{Eq. 9A}$$

Also, in the BPSK mode, if 180 degree phase ambiguity is occurred, a transmitting constellation 'A' is demodulated to '−A' and a constellation '−A' is demodulated to 'A'. In this case, the phase ambiguity value is 180 degree as below equation 9B.

$$R_{bpsk,180}(k) = 4[(-A) \cdot \sqrt{2} + (A) \cdot (-\sqrt{2})] = -8\sqrt{2}A = 8A\sqrt{2}e^{j180°} \quad \text{Eq. 9B}$$

Detection of the phase ambiguity value in case of a QPSK modulation is explained in below.

In the QPSK mode modulation, a modulated signal of one byte of frame synchronization symbol is expressed as following equation 10.

$$s_i = (1+j) \text{ (in case of 0), } (-1-j) \text{ (in case of 1)} \quad \text{Eq. 10}$$

Figure 4B:
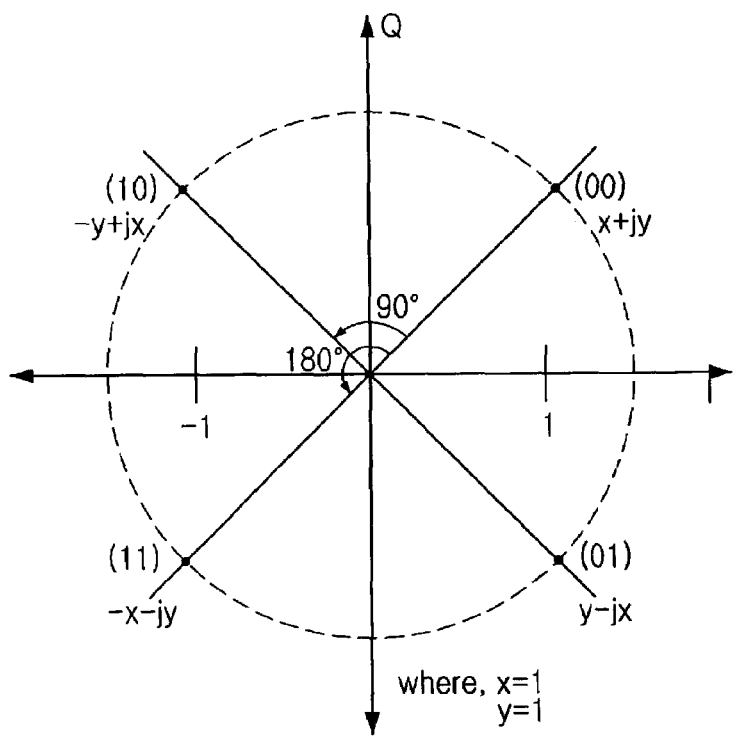

A constellation of the modulated signal of equation 10 is shown in FIG. 4B.

Phase ambiguity values such as 90 degree, 180 degree and 270 degree are in the modulated signal $z_k$ as shown in below table and FIG. 4B.

TABLE 3

| Phase ambiguity value | Input "0" | Input "1" |
|---|---|---|
| 0° | x + jy | −x − jy |
| 90° | −y + jx | y − jx |
| 180° | −x − jy | x + jy |
| 270° | y − jx | −y + jx |

The phase ambiguity values can be computed by using the correlator of Eq. 8.

As shown in Eq. 10, if the frame synchronization symbol is 0, it is mapping to 'x+jy' and if it is 1, then it is mapped to '−x−jy'.

Following equation 11A expresses a phase ambiguity information when there is no the phase ambiguity and it's phase ambiguity value is computed as 0 degree.

$$R_{qpsk,0}(k) = 4[(x+jy) \cdot (1+j)^* + (-x-jy) \cdot (-1-j)^*] = 8(x+y)$$
$$= 16e^{j0°} \quad \text{Eq. 11A}$$

If there is 90° phase ambiguity as shown in Table 3 and FIG. 4B, then a constellation 'x+jy' is demodulated to '−y+jx', and a constellation '−x−jy' is demodulated to 'y−jx'. In this case, the phase ambiguity value 90° is detected by using following equation 11B.

$$R_{qpsk,90}(k) = 4[(-y+jx) \cdot (1+j)^* + (y-jx) \cdot (-1-j)^*] = j8(x+y)$$
$$= j16 = 16e^{j90°} \quad \text{Eq. 11B}$$

If there is 180 degree phase ambiguity as shown in Table 3 and FIG. 4B, then a constellation 'x+jy' is demodulated to '−x−jy', and a constellation '−x−jy' is demodulated to 'x+jy'. In this case, the phase ambiguity value 180 degree is detected by using following equation 11C.

$$R_{qpsk,180}(k)=4[(-x-jy)\cdot(1+j)^*+(x+jy)\cdot(-1-j)^*]=-8(x+y)=-16=16e^{j180°}$$ Eq. 11C If there is 270 degree phase ambiguity as shown in Table 3 and FIG. 4B, then a constellation 'x+jy' is demodulated to 'y−jx', and a constellation '−x−jy' is demodulated to '−y+jx'. In this case, the phase ambiguity value 270 degree is detected by using following equation 11D.

$$R_{qpsk,270}(k)=4[(y-jx)\cdot(1+j)^*+(-y+jx)\cdot(-1-j)^*]=-j8(x+y)=-j16=16e^{j270°}$$ Eq. 11D Detection of phase ambiguity value in TC-8PSK mode is explained in detail as following.

In the TC-8PSK mode modulation, a demodulation signal of one byte of frame synchronization symbol is expressed as following equation 12 according to code rate.

$$s_i=(a+jb) \text{ (in case of 0) } (b-ja) \text{ (in case of 1), R=2/3}$$

$$s_i=(a+jb) \text{ (in case of 0) } (a-jb) \text{ (in case of 1), R=8/9}$$
Eq. 12

Figure 4C:
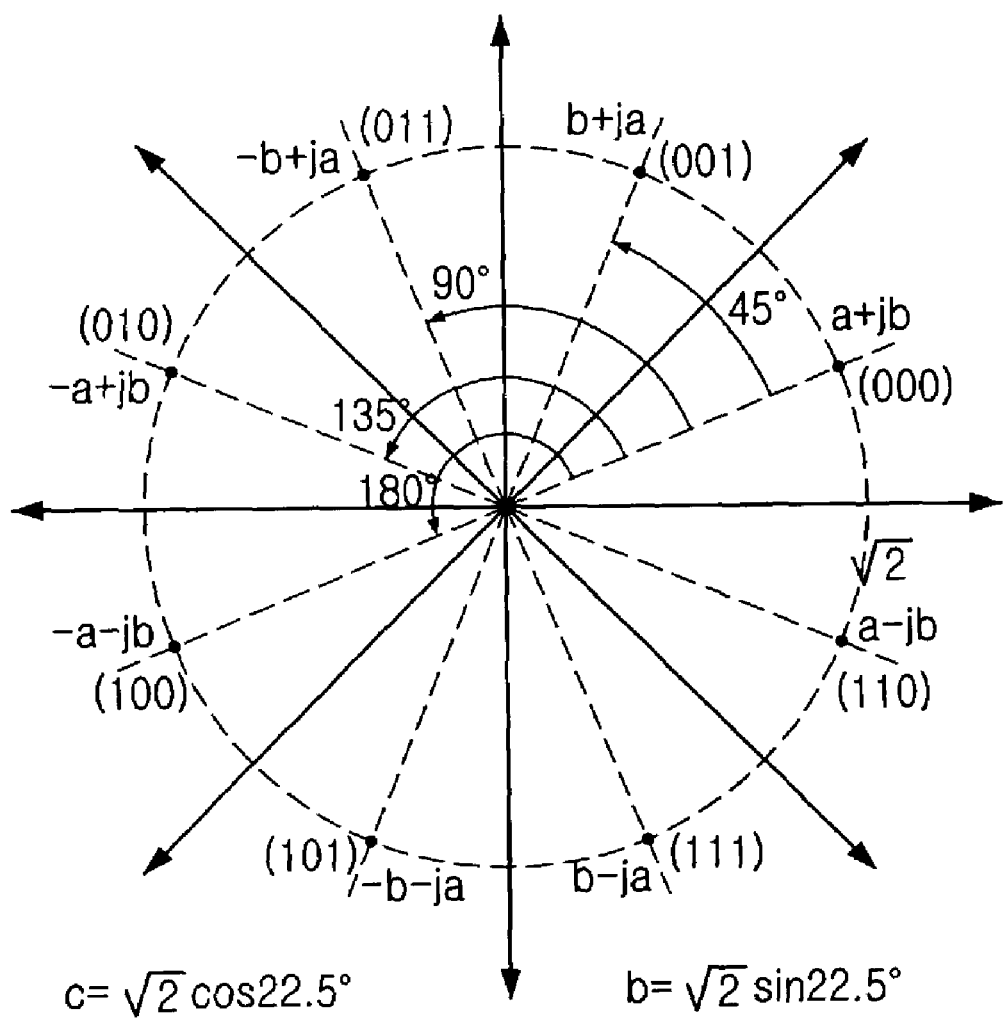

A constellation of the demodulation signal is shown in FIG. 4C. In the demodulation signal, there may be phase ambiguity values such as 45 degree, 90 degree, 135 degree, 180 degree, 225 degree, 270 degree and 315 degree as shown in FIG. 4C and below table. The phase ambiguity values can be computed by using the correlator of Eq. 8.

TABLE 4

| phase ambiguity value | Input 0 | Input 1 |
|---|---|---|
| 0° | a + jb | b − ja |
| 45° | b + ja | a − jb |
| 90° | −b + ja | a + jb |
| 135° | −a + jb | b + jb |
| 180° | −a − jb | −b + ja |
| 225° | −b − ja | −a + jb |
| 270° | b − ja | −a − jb |
| 315° | a − jb | −b − ja |

In case of "R=2/3" of TC-8PSK mode, if a frame synchronization symbol is 0, it is mapped to 'a+jb' and if the frame synchronization symbol is 1, it is mapped to 'bja' as like as Eq. 12.

Phase ambiguity information is defined as following equation 13A in case there is no phase ambiguity and its phase ambiguity value is 0 degree.

$$R_{8p,0}(k)=4[(a+jb)^*(a+jb)^*+(b-ja)\cdot(b-ja)^*)]=8(a^2+b^2)=16e^{j0°}$$ Eq. 13A If there is 45 degree phase ambiguity, a constellation 'a+jb' is demodulated to 'b+ja' and the constellation 'b−ja' is demodulated to 'a−jb'. In this case, the phase ambiguity value 45 degree can be computed by below equation 13B and detected.

$$R_{8p,45}(k) = \frac{4[(b+ja)\cdot(a+jb)^* + (a-jb)\cdot(b-ja)^*]=}{8[2ab+j(a^2-b^2)]}$$ Eq. 13B $$= 8(\sqrt{2}+j\sqrt{2}) = 16e^{j45°}$$

If there is 90 degree phase ambiguity, a constellation 'a+jb' is demodulated to '−b+ja' and the constellation 'b−ja' is demodulated to 'a+jb'. In this case, the phase ambiguity value 90 degree can be computed by below equation 13C and detected.

$$R_{8p,90}(k) = \frac{4[(-b+ja)\cdot(a+jb)^* + (a+jb)\cdot(b-ja)^*]=}{j8(a^2+b^2)}$$ Eq. 13C $$= j16 = 16e^{j90°}$$

If there is 135 degree phase ambiguity, a constellation 'a+jb' is demodulated to '−a+jb' and the constellation 'b−ja' is demodulated to 'b+ja'. In this case, the phase ambiguity value 135 degree can be computed by below equation 13D and detected.

$$R_{8p,135}(k) = \frac{4[(-a+jb)\cdot(a+jb)^* + (b+ja)\cdot(b-ja)^*]=}{8[(b^2-a^2)+jab]}$$ Eq. 13D $$= 8(-\sqrt{2}+j\sqrt{2}) = 16e^{j135°}$$

If there is 180 degree phase ambiguity, a constellation 'a+jb' is demodulated to '−a−jb' and the constellation 'b−ja' is demodulated to '−b+ja'. In this case, the phase ambiguity value 180 degree can be computed by below equation 13E and detected.

$$R_{8p,180}(k)=4[(-a-jb)\cdot(a+jb)^*+(-b+ja)\cdot(b-ja)^*)]=-8(a^2+b^2)=16e^{j180°}$$ Eq. 13E If there is 225 degree phase ambiguity, a constellation 'a+jb' is demodulated to '−b−ja' and the constellation 'b−ja' is demodulated to '−a+jb'. In this case, the phase ambiguity value 225 degree can be computed by below equation 13F and detected.

$$R_{8p,225}(k) = 4[(-b-ja)\cdot(a+jb)^* + (-a+jb)\cdot(b-ja)^*]$$ Eq. 13F $$= -8[2ab+j(a^2-b^2)]$$

$$= 8(-\sqrt{2}-j\sqrt{2}) = 16e^{j225°}$$

If there is 270 degree phase ambiguity, a constellation 'a+jb' is demodulated to 'b−ja' and the constellation 'b−ja' is demodulated to '−a−jb'. In this case, the phase ambiguity value 225 degree can be computed by below equation 13G and detected.

$$R_{8p,270}(k) = 4[(b-ja)\cdot(a+jb)^* + (-a-jb)\cdot(b-ja)^*]$$ Eq. 13G $$= -j8(a^2+b^2)$$

$$= -j16 = 16e^{j270°}$$

If there is 315 degree phase ambiguity, a constellation 'a+jb' is demodulated to 'a−jb' and the constellation 'b−ja' is demodulated to '−b−ja'. In this case, the phase ambiguity value 315 degree can be computed by below equation 13H and detected.

$$R_{8p,315}(k) = 4[(a-jb)\cdot(a+jb)^* + (-b-ja)\cdot(b-ja)^*]$$ Eq. 13H

-continued $$= 8[(a^2 - b^2) - jab]$$

$$= 8(\sqrt{2} - j\sqrt{2}) = 16e^{j315°}$$

Therefore, when there are phase ambiguity values in the signal demodulated by the 8PSK modulation, the phase ambiguity values detected by a complex correlator are shown in below table.

TABLE 5

| phase ambiguity value | detected phase value |
|---|---|
| 0° | $R_{8p,0}(k) = 1 = e^{j0°}$ |
| 45° | $R_{8p,45}(k) = 0.5 \times (\sqrt{2} + j\sqrt{2}) = e^{j45°}$ |
| 90° | $R_{8p,90}(k) = j = e^{j90°}$ |
| 135° | $R_{8p,135}(k) = 0.5 \times (-\sqrt{2} + j\sqrt{2}) = e^{j135°}$ |
| 180° | $R_{8p,180}(k) = -1 = e^{j180°}$ |
| 225° | $R_{8p,225}(k) = -0.5 \times (\sqrt{2} + j\sqrt{2}) = e^{j225°}$ |
| 270° | $R_{8p,270}(k) = -j = e^{j270°}$ |
| 315° | $R_{8p,315}(k) = 0.5 \times (\sqrt{2} - j\sqrt{2}) = e^{j315°}$ |

As mentioned above, computation of the phase ambiguity values according to the modulation modes such as BPSK, QPSK, 8PSK is explained.

Based on the above-mentioned computation steps, the phase ambiguity value of the modulated signal according to various modulation modes such as BPSK, QPSK and 8PSK can be computed by following equation 14.

$$e^{j\theta} = \frac{1}{16} \sum_{i=0}^{7} \hat{d}_{k-i} \hat{S}_i^* \qquad \text{Eq. 14}$$

In Eq. 14, $d_k$ is a complex domain symbol decided from a demodulated signal $z_k$ and $s_i$ is a frame synchronization symbol mapping constellation. θ is the phase ambiguity value and the phase ambiguity value represents an amount shifting from the original signal by the phase ambiguity. Therefore, by using Eq. 14, the phase ambiguity value of receiving data can be computed and an original signal can be generated by eliminating the computed phase ambiguity value from the receiving data. The phase ambiguity value computed by using Eq. 14 can be eliminated by using below equation 15.

$$y_k = z_k \times (e^{j\theta})^* \qquad \text{Eq. 15}$$

By using Eq. 15, a phase ambiguity eliminator, which recovers phase ambiguous signal to original signal, can be implemented. Therefore, the phase ambiguity is resolved by multiplying a conjugate of the phase ambiguity value to the demodulated signal $Z_k$.

Therefore, the present invention implements Eqs. 14 and 15 as a logical circuit for resolving the phase ambiguity of the receiving data.

Hereinafter, an apparatus for resolution of phase ambiguity in accordance with a preferred embodiment of the present invention is explained in detail.

Figure 5:
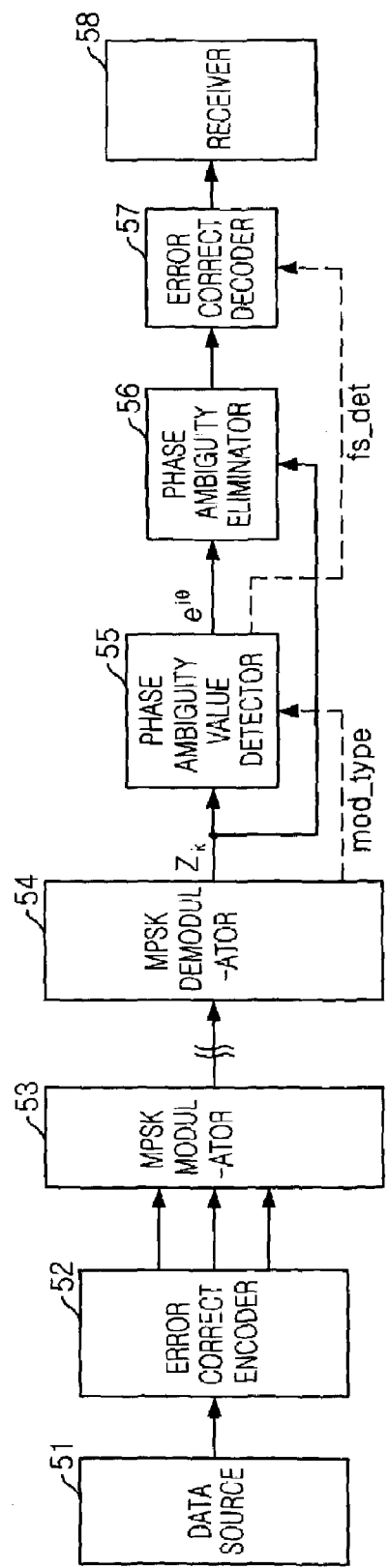
FIG. 5 is a diagram illustrating an apparatus for resolution of phase ambiguity in accordance with a preferred embodiment of the present invention.

FIG. 5 is an apparatus for resolution of phase ambiguity of the present invention.

Referring to FIG. 5, the apparatus include a data source 51, an error correct encoder 52, a modulator 53, a demodulator 54, a phase ambiguity value detector 55, a phase ambiguity eliminator 56, an error correct decoder 57 and a receiver 58.

The error correct encoder 52 receives source data and generates coded data by encoding the source data in order to correct error.

The modulator 53 receives the coded data from the error correct encoder 52 and generates modulated signal by modulating the coded data.

The demodulator 54 receives the modulated signal and detects a modulation type information from the demodulated data. The demodulator 54 also generates demodulated data by demodulating the modulated signal.

The phase ambiguity value detector 55 receives the demodulated data and the modulation type information, and detects a phase ambiguity value from the demodulated data based on a frame synchronization information and the modulation type information.

The phase ambiguity eliminator 56 receives the phase ambiguity value and the demodulated data, and generates a phase ambiguity eliminated data by inverting the phase ambiguity value and multiplying the inverted phase ambiguity value and the demodulated data.

The decoder 57 receives the phase ambiguity eliminated data and decodes the phase ambiguity eliminated data in order to correct error in the phase ambiguity eliminated data.

The phase ambiguity value detector 55 is implemented based on Eq. 14 and the phase ambiguity eliminator 56 is implemented based on Eq. 15.

The phase ambiguity values detector 55 and the phase ambiguity eliminator 56 will be explained in detail as referring to FIGS. 6 and 7 as following.

Figure 6:
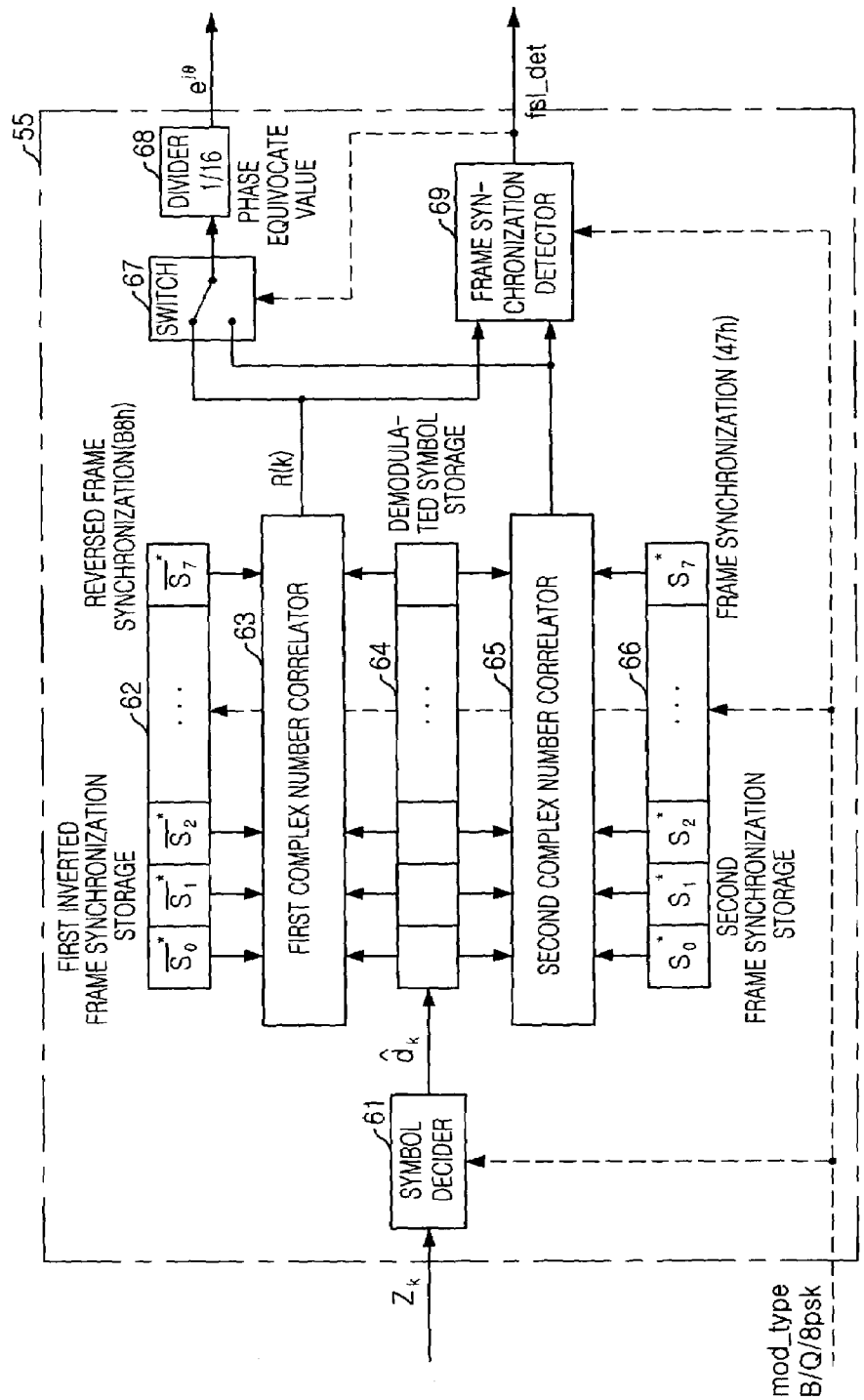
FIG. 6 is a diagram showing a phase ambiguity value detector in FIG. 5 in accordance with a preferred embodiment of the present invention.

FIG. 6 is a diagram showing the phase ambiguity value detector 55 in FIG. 5 in accordance with a preferred embodiment of the present invention.

Referring to FIG. 6, the phase ambiguity value detector 52 includes a symbol decider 61, a first inverted frame synchronization storage 62, a first complex correlators 63, a demodulated symbol storage 64, a second complex correlators 65, a second frame synchronization storage 66, a switch 67, a divider 68 and a frame synchronization symbol detector 69.

The symbol decider 61 receives the demodulated data and generates decided demodulated symbols by deciding the demodulated symbols.

The first frame synchronization storage 62 receives the modulation type information and generates a inverted frame synchronization data by converting the modulation type information into a predetermined complex data format of frame synchronization pattern. The inverted frame synchronization pattern is stored in the first inverted frame synchronization storage 62.

The first complex correlators 63 computes a first intermediate phase ambiguity value information R(k) based on a complex correlation function by receiving data from the demodulated symbol storage 64 and the first inverted frame synchronization storage 62.

The demodulated symbol storage 64 receives the demodulated decision symbols and stores that symbols as many as a length of the frame synchronization data.

The second complex correlators 65 computes a second intermediate phase ambiguity value information based on a complex correlation function by receiving data from the demodulated symbol storage 64 and the second frame synchronization storage means 66.

The second frame synchronization storage 66 receives the modulation type information and generates a frame synchronization data by converting the modulation type information into a predetermined complex data format of frame synchronization pattern. Also, the frame synchronization storage 66 stores the frame synchronization pattern.

The switch 67 receives the control signal, which is the detected first and second frame synchronization pattern information by frame synchronization detector 69. Based on the control signal, the switch 67 selects one of the first intermediate phase ambiguity value and the second intermediate phase ambiguity value as a detected frame synchronization pattern.

The divider 68 generates a phase ambiguity value by receiving the selected phase ambiguity information and dividing the selected phase ambiguity information by 16.

The frame synchronization detector 69 receives and analyzes the first and the second intermediate phase ambiguity values information R(k) and generates a control signal for controlling the switch 67.

To reduce the time spending to resolve the phase ambiguity, it is implemented to resolve the phase ambiguity by using both frame synchronization symbol inverted frame synchronization symbol. So the phase ambiguity is resolved at the moment of receiving the frame synchronization symbol or reversed frame synchronization symbol. Therefore, the present invention is suitable for not only the burst mode but also the continuous mode communication system since the phase ambiguity is resolved at the moment of receiving the frame synchronization symbol. Furthermore, the present invention can be used in an adaptive MODEM utilizing BPSK, QPSK and TC-8PSK by using identical algorithm.

In the present invention, the phase ambiguity value is directly detected from the frame synchronization symbol and an absolute value of the phase ambiguity value computed according to a length of the frame synchronization symbol can be vary. Also, the phase ambiguity value is computed based on values on real number axis and imaginary number axis of complex number domain. Therefore, amplitude of the phase ambiguity value may be two times larger a symbol bit.

In the divider 68, the phase ambiguity value information R(k) inputted from the switch 67 is divided by 16. In the preferred embodiment of the present invention, a MPEG-2 TS is used as a frame synchronization symbol. Since one byte of the MPEG-2 TS is 8 bits, the integer number '16' is used by considering 8 bits times 2. Therefore, in the FIG. 6, the phase ambiguity detector selects a phase having 1 as amplitude by dividing the phase ambiguity values by 16 for deciding. As mentioned above, the phase of receiving signal is corrected without changing amplitude by computing a conjugate of the phase ambiguity having 1 as amplitude and multiplying it to the receiving signal.

Figure 7:
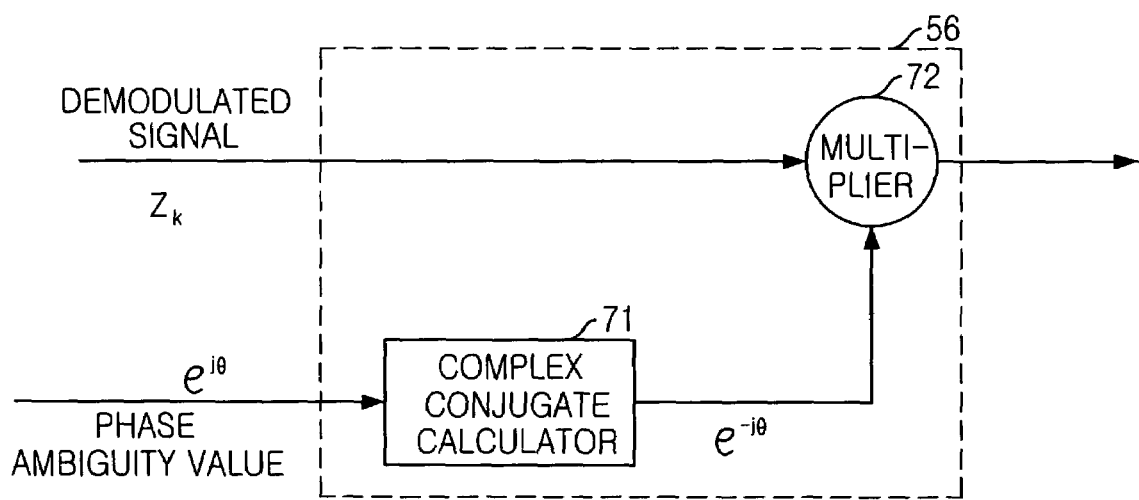
FIG. 7 is a diagram representing a phase ambiguity eliminator in FIG. 5 in accordance with a preferred embodiment of the present invention.

FIG. 7 is a diagram representing the phase ambiguity eliminator in FIG. 6 in accordance with a preferred embodiment of the present invention.

Referring to FIG. 7, the phase ambiguity eliminator includes a complex conjugate calculator 71 for reversing the phase ambiguity value in order to eliminate the phase ambiguity and a multiplier 72.

The complex conjugate calculator 71 receives the phase ambiguity value from the phase ambiguity value detector and generates an inverted phase ambiguity value by computing a complex conjugate.

The multiplier 72 generates a phase ambiguity eliminated data by receiving the demodulated data and multiplying the demodulated data and the inverted phase ambiguity value from the complex conjugate calculator 71 in order to eliminate the phase ambiguity from the demodulated data.

The above-mentioned present invention can be embodied as a program and stored in a computer-readable recording medium such as CD ROMs, RAMs, ROMs, floppy disks, hard disks, and optical-magnetic disks.

As mentioned above, the present invention can adaptively resolve a phase ambiguity generated according to various modulation modes by using same algorithm so it can effectively implemented to an adaptive MODEM.

Also, the present invention can instantly resolve the phase ambiguity at the moment of receiving the frame synchronization symbol, therefore, it can be implemented to not only a burst mode communication but also a continuous mode communication. Specially, the present invention can resolve the phase ambiguity without degrading a receiving performance in a differential encoder.

While the present invention has been described with respect to certain preferred embodiments, it will be apparent to those skilled in the art that various changes and modifications may be made without departing from the scope of the invention as defined in the following claims.

What is claimed is:

1. An apparatus for resolution of phase ambiguity, wherein the apparatus is adaptively used in various types of data communication system including a burst mode communication and a continuous mode communication and various modulation types, said apparatus comprising:

coding means for receiving source data and generating coded data by encoding the source data in order to correct error;

modulation means for receiving the coded data from the coding means and generating modulated signal by modulating the coded data;

demodulation means for receiving the modulated signal, detecting a modulation type information from the modulated signal and generating demodulated data by demodulating the modulated signal;

phase ambiguity detection means for receiving the demodulated data and the modulation type information, and detecting a phase ambiguity value from the demodulated data based on a frame synchronization information;

phase ambiguity elimination means for receiving the phase ambiguity value and the demodulated data, and generating a phase ambiguity eliminated data by inverting the phase ambiguity value and multiplying the inverted phase ambiguity value and the demodulated data; and decoding means for receiving the phase ambiguity eliminated data and decoding the phase ambiguity eliminated data in order to correct error in the phase ambiguity eliminated data.

2. The apparatus as recited in claim 1, wherein the phase ambiguity detection means includes:

symbol decision means for receiving the demodulated data and the modulation type information and generating demodulated decision symbols by deciding the demodulated symbols from the demodulated data having noise;

frame synchronization storage means for receiving the modulation type information from the demodulation means, generating a frame synchronization data by converting the modulation type information into a predetermined complex data format of frame synchronization pattern and storing the frame synchronization pattern;

inverted frame synchronization storage means for receiving the modulation type information from the demodulation means, generating an inverted frame synchronization data by converting and inverting the modulation type information into a predetermined complex format of frame synchronization pattern, and storing the inverted frame synchronization pattern;

demodulated symbol storage means for receiving the demodulated decision symbols from the symbol decision means and storing the demodulated decision symbols as many as a length of the frame synchronization data;

a first complex correlator for detecting a first intermediate phase ambiguity value information based on a complex correlation function by receiving data from the demodulated symbol storage means and the inverted frame synchronization storage means;

a second complex correlator for detecting a second intermediate phase ambiguity value information based on a complex correlation function by receiving data from the demodulated symbol storage means and the inverted frame synchronization storage means;

frame synchronization detection means for detecting a frame synchronization by receiving and analyzing the first and second intermediate phase ambiguity value information R(k), and generating a control signal;

a switch for receiving the control signal, a first data pattern included in the first intermediate frame synchronization information and a second data pattern included in the second intermediate frame synchronization information, and selecting one of the first data pattern and the second data pattern according to the control signal as a detected frame synchronization pattern; and a divider for generating a phase ambiguity value by receiving a selected phase ambiguity value information R(k) and dividing the selected phase ambiguity value information by 16.

3. The apparatus as recited in claim 1, wherein the phase ambiguity elimination means includes:

complex conjugate computation means for receiving the phase ambiguity value from the phase ambiguity value detection means and generating an inverted phase ambiguity value by computing a complex conjugate; and multiplication means for generating a phase ambiguity eliminated demodulated data by receiving the demodulated data and multiplying the demodulated data and the inverted phase ambiguity value from the complex conjugate computation means in order to eliminate the phase ambiguity from the demodulated data.

4. The apparatus as recited in claim 1, the phase ambiguity value detection means is implemented based on an equation expressed as, $$e^{j\theta} = \frac{1}{16}\sum_{i=0}^{7} \hat{d}_{k-i}\hat{S}_i^*.$$

where $\hat{d}_k$ is a complex domain symbol decided from a demodulated signal $z_k$, $\hat{S}_i$ is a frame synchronization symbol mapping constellation, and $\theta$ is the phase ambiguity value.

5. The apparatus as recited in claim 1, the phase ambiguity elimination means is implemented based on an equation expressed as, $y_k = z_k \times (e^{j\theta})^*$, where $z_k$ is a demodulated signal, $\theta$ is the phase ambiguity value, and $y_k$ is an output of the phase ambiguity elimination means.

6. The apparatus as recited in claim 2, the phase ambiguity detection means for detecting the phase ambiguity value at a moment receiving the frame synchronization information.

7. The apparatus as recited in claim 1, wherein the demodulation means detects a type of modulation and adaptively resolves a phase ambiguity generated according to the various modulation modes.

* * * * *